(12) United States Patent
Ma (10) Patent No.: US 9,332,812 B2
(45) Date of Patent: May 10, 2016

(54) ILLUMINABLE BRACELET

(71) Applicant: Jiadong Ma, Darien, IL (US)

(72) Inventor: Jiadong Ma, Darien, IL (US)

(73) Assignee: SLIS INC., Darien, IL (US)

( * ) Notice: Subject to any disclaimer, the term of this patent is extended or adjusted under 35 U.S.C. 154(b) by 0 days.

(21) Appl. No.: 13/954,729

(22) Filed: Jul. 30, 2013

(65) Prior Publication Data

US 2015/0033794 A1    Feb. 5, 2015

(51) Int. Cl.
*A44C 5/00* (2006.01)
*A44C 15/00* (2006.01)
*A01K 27/00* (2006.01)

(52) U.S. Cl.
CPC ............ *A44C 15/0015* (2013.01); *A01K 27/001* (2013.01); *A01K 27/006* (2013.01); *A44C 5/0007* (2013.01)

(58) Field of Classification Search
CPC ............... A44C 5/0015; A44C 5/0007; A44C 15/0015; A01K 27/006; A01K 27/001
USPC ........... 119/859; 362/103, 104, 108; 63/3–3.2
See application file for complete search history.

(56) References Cited

U.S. PATENT DOCUMENTS

| | | | | |
|---|---|---|---|---|
| 5,552,664 | A * | 9/1996 | Csoknyai et al. | 313/488 |
| 7,311,411 | B2 * | 12/2007 | VanderSchuit | 362/84 |
| 2002/0011219 | A1 * | 1/2002 | Chien | 119/859 |
| 2002/0122316 | A1 * | 9/2002 | Hsieh | 362/570 |
| 2011/0194276 | A1 * | 8/2011 | Au | 362/104 |
| 2011/0197826 | A1 * | 8/2011 | Hurwitz | 119/859 |
| 2012/0085298 | A1 * | 4/2012 | Wolters | 119/859 |
| 2013/0042821 | A1 * | 2/2013 | Roberts et al. | 119/863 |

OTHER PUBLICATIONS

PetMartop Website, "LED Dog Collar" (http://www.petmartop.com/product.asp?ClassID=001006001).

* cited by examiner

*Primary Examiner* — Abigail Morrell
(74) *Attorney, Agent, or Firm* — Greenberg Traurig, LLP (57) ABSTRACT

An illuminable bracelet generally includes a buckle, a band having a first end and a second end, a closure member disposed at the second end, a light source, and at least one logo disposed along an inner surface of the band. The band may be formed of a polymeric material that allows light from the light source in the buckle to permeate through the band, illuminating the band and the at least one logo of the band. The band may form a closed-loop when a closure member is used to secure the second end of the band to the buckle. Further, the buckle may have a switch that allows a user to control the light source.

17 Claims, 6 Drawing Sheets

ILLUMINABLE BRACELET

FIELD OF THE DISCLOSURE

The present description relates generally to illuminable bracelets and, more particularly, to illuminable bracelets having logos disposed along a band.

BACKGROUND OF RELATED ART

It is known that bracelets and necklaces come in a multitude of shapes and sizes and are formed from a variety of materials. Likewise, bracelets and necklaces are designed for a diverse range of consumers. For example, some bracelets and necklaces are formed from silver and are intended to be worn as jewelry, while other bracelets and necklaces are formed from composite materials and are intended to be worn as therapeutic accessories. Still other bracelets are designed solely for reflective or novelty purposes.

It is also known that certain types of plastics can be illuminated. In the field of bracelet and necklace design, a light-emitting diode (LED) or other light source is sometimes included in a clasp, latching mechanism, or other buckle such that the light source illuminates a portion of a band defining part of the bracelet or necklace. One problem with existing designs, however, is that light from the light source does not extend throughout the loop formed by the band. Instead, the band dissipates the light relatively close to the light source. This problem is at least partially attributable to the material composition of the band.

DETAILED DESCRIPTION

The following description of illuminable bracelets is not intended to limit the scope of the present disclosure to the precise form or forms detailed herein. Instead the following description is intended to be illustrative so that others may follow its teachings.

An illuminable bracelet may generally include a buckle, a light source, a band with first and second ends, and a closure member at the second end of the band. The light source, which may include one or more incandescent bulbs, fluorescent bulbs, high-intensity discharge bulbs, or light-emitting diodes (LEDs), for example, may be disposed within the buckle, and the first end of the band may be affixed to the buckle. The band may be formed of a polymeric material that is transparent or substantially transparent, at least such that light from the light source may permeate through the band to the second end and be seen by a human eye. The band may also include at least one logo engraved, etched, incised, or otherwise imparted on an inner surface of the band. The light from the light source may also illuminate the at least one logo of the band.

Figure 1:
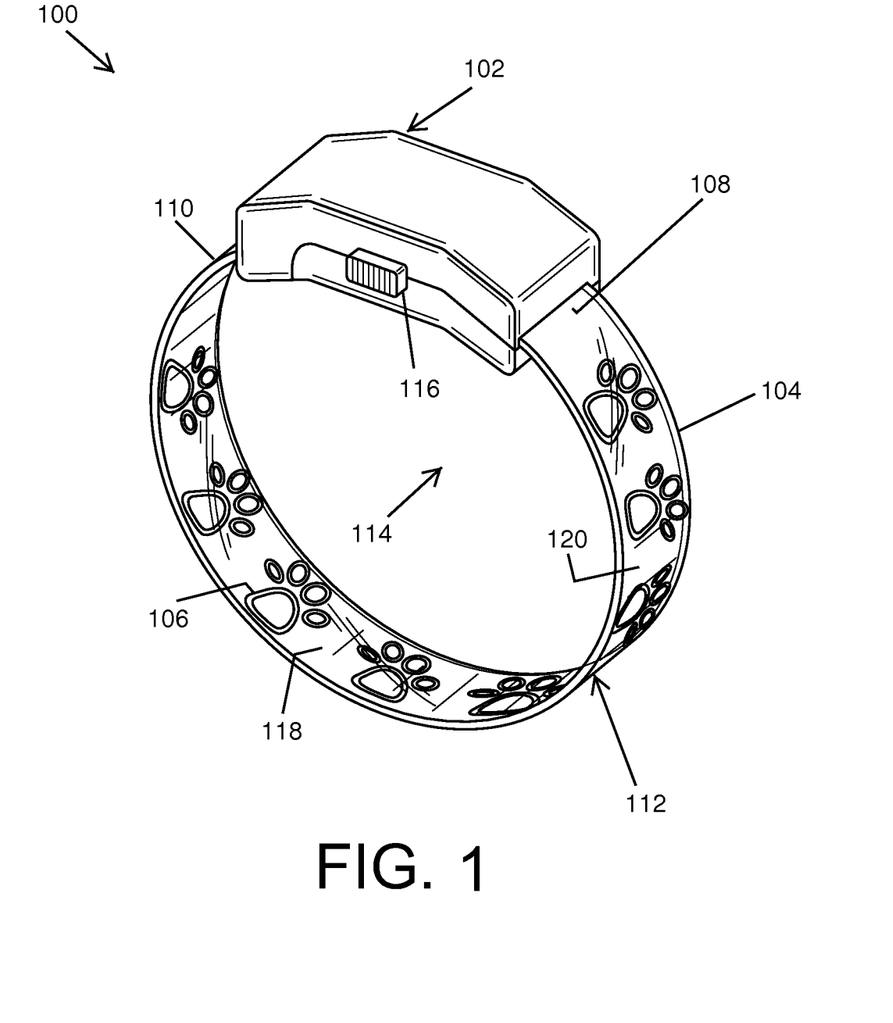
FIG. 1 is an isometric view of an example illuminable bracelet having logos disposed along a band.

Referring now to FIG. 1, one embodiment of illuminable bracelet 100 is shown. As those having ordinary skill in the art will appreciate, the term "bracelet" may encompass armbands, necklaces, chokers, anklets, hair pieces, and the like. Nonetheless, the illuminable bracelet 100 shown in FIG. 1 generally includes a buckle 102, a band 104, and logos 106 disposed on the band 104. A first end 108 of the band 104 may be affixed to the buckle 102 such that a second end 110 of the band 104 may be releasably secured to the buckle 102 to form a closed-loop 112 defining an opening 114 for a wrist, waist, neck, ankle, and so on.

Further, buckle 102 may include a switch 116 that is electrically coupled to a light source disposed within the buckle 102. In one embodiment, a user may activate the light source within the buckle 102 by sliding the switch 116 from an OFF state to an ON state. In other embodiments, the light source within the buckle 102 may have more than two modes (i.e., ON and OFF). For instance, in addition to ON and OFF modes, the light source may be capable of a slow strobe and a fast strobe. In that case, the switch 116 may be slid between four positions: a first position corresponding to an OFF state, a second position corresponding to a slow strobe, a third position corresponding to a fast strobe, and a fourth position corresponding to an ON state where the light source does not strobe. Other types of switches are also available to activate the light source, such as a pressure button-type or toggle switch. It should be understood that the terminology "first," "second," "third," and "fourth" are used for example purposes only and do not limit the present disclosure to only these particular number or modes. In still other embodiments, in addition to or in the alternative of, the light source could have modes corresponding to various colors. In these embodiments, the colors may be changed by one or more switches on the buckle. In yet another embodiment, the light source may have a mode where the brightness of the light changes, either periodically or continuously. As disclosed below, the buckle 102 and/or light source may have one or more filters that restrict the wavelength of light that is emitted from the light source, thus giving the band 104 color.

Moreover, in some embodiments band 104 is formed of a polymeric material that is transparent or mostly transparent, such as thermoplastic polyurethane (TPU), for instance. The polymeric material allows light that is emitted from the light source within buckle 102 to extend through band 104 around the closed-loop 112 such that light from the light source is visible to a human eye throughout the band until the second end 110 of band 104. Although TPU is one example material that allows the light to extend through the band 104 around the closed-loop 112, those having ordinary skill in the art will understand that numerous materials will foster the permeation of light in the band 104.

Furthermore, the logos 106 disposed on band 104 may be formed in a wide variety of ways. For instance, the logos 106 may be placed on the band 104 with the aid of a laser. In other examples, the logos 106 may be placed on band 104 by applying heat just prior to stamping the band 104. While logos 106 may be placed on either side of band 104, the logos are best illuminated from the light permeating through band 104 when placed on inner side 118 of band 104 as opposed to outer side 120. Further, in some embodiments the logos 106 may be adhered through embossments, which have a sunken or raised surface. In still other embodiments, the logos 106 may be engravings from incisions that are carved into band 104. It will be appreciated that any embossments, engravings, or the like need not be particularly deep, which may lessen a person wearing the illuminable bracelet 100 from experiencing any discomfort or irritation from the logos 106. By placing logos 106 on band 104, the light illuminates the logos 106 more so than logos merely placed upon topical layers applied to band 104.

The example logos 106 shown in FIG. 1 are paw prints. Those having ordinary skill in the art will recognize that the logos 106 of the present disclosure are in no way limited to paw prints. Logos 106 may be virtually any graphical element, pattern, text, or the like. For instance, a company wishing to utilize the present disclosure may be interested in using a logo that consists of the company's name.

Figure 2:
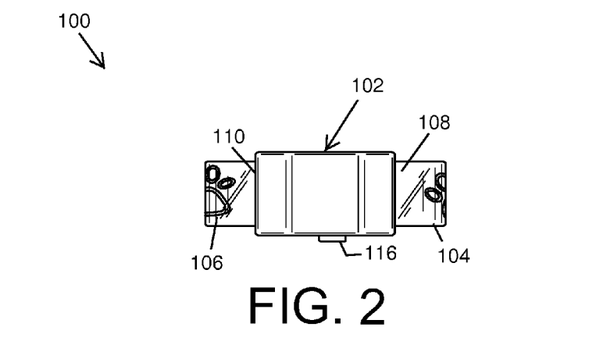
FIG. 2 is a top view of the example illuminable bracelet of FIG. 1.

With reference now to FIG. 2, illuminable bracelet 100 is shown in a top view, where buckle 102 appears to be generally rectangular in shape. The present disclosure, however, is in no way limited to buckles that are generally rectangular in shape. Rather, buckle 102 may be formed from countless different shapes, including those representing particular objects. For example, the buckle 102 may be shaped in the form of a dog bone. Creating a buckle in the shape of a particular object may allow the illuminable bracelet to carry a particular overall theme, especially when combined with at least one logo imparted on the band. Further, as evidenced by the Figures and the descriptions herein, nothing in the present disclosure limits buckle 102 to a conventional buckle or a buckle having a tongue.

Figure 3:
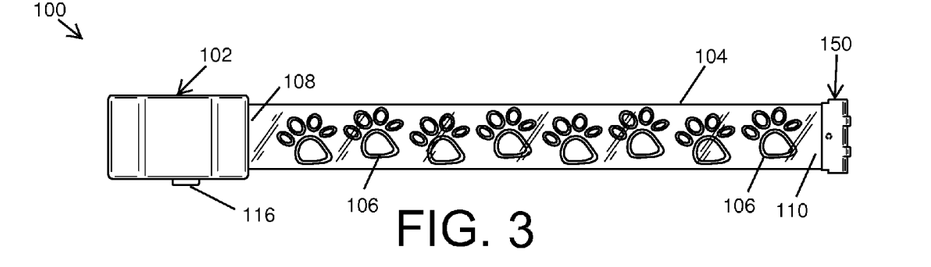
FIG. 3 is a top view of the example illuminable bracelet of FIG. 1 shown in an open position.

FIG. 3 shows a top view of illuminable bracelet 100 in an open position. More specifically, a closure member 150 disposed at the second end 110 of the band 104 has been unsecured from buckle 102, and band 104 has been laid flat. The closure member 150 will be described further with reference to FIG. 12. However, it should be understood that closure member 150 and buckle 102 may take virtually any known form that would allow a band to be releasably secured around a wrist, neck, ankle, and so on. For instance, in some embodiments, the closure member 150 may simply be notches or holes disposed at the first end 108 of the band 104. In other embodiments, the closure member 150 may be an attachment disposed at the first end 108 of the band 104. That said, FIG. 3 also provides a perspective of possible spacing for the logos 106 along band 104. Many aspects about the logos 106 may vary, such as the size of the logos 106, an amount of space between the logos 106, the quantity of logos 106, and the like. In some embodiments, for instance, band 104 may only contain one logo without any repetition of logos. In still other embodiments, logos containing text placed within the band 104 may be intended to complement that of other bands. By way of example, each of a university's two primary colors could be spelled out on two different illuminable bracelets. In this way, consumers may be encouraged to purchase complementary bracelets.

Figure 4:
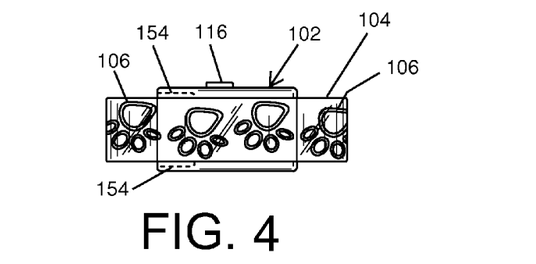
FIG. 4 is a bottom view of the example illuminable bracelet of FIG. 1.
Figure 5:
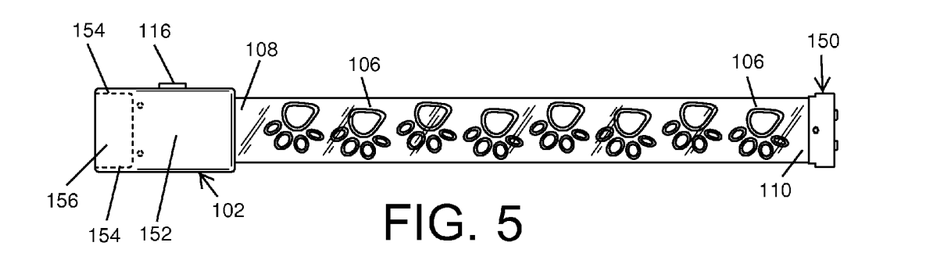
FIG. 5 is a bottom view of the example illuminable bracelet of FIG. 1 shown in an open position.

Turning to FIGS. 4-5, the illuminable bracelet 100 is shown from a bottom view. In FIG. 4, closure member 150 disposed at second end 110 of band 104 of illuminable bracelet 100 is shown to be secured to buckle 102, while in FIG. 5 band 104 has been laid flat with the closure member 150 unsecured from buckle 102. In this embodiment, bottom 152 of buckle 102 includes walls 154 that at least partially define a cavity 156 that selectively receives the closure member 150 when closure member 150 is secured to buckle 102.

Figure 6:
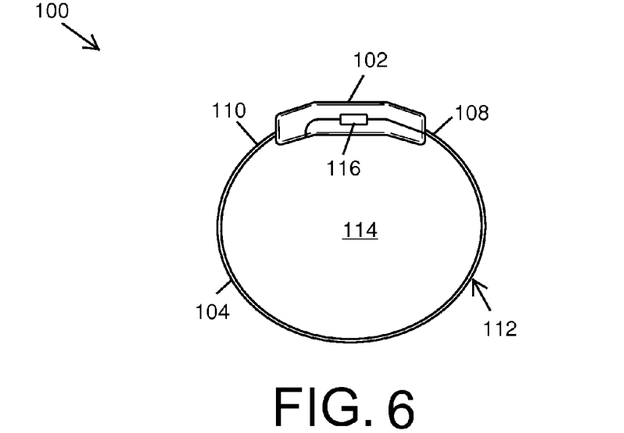
FIG. 6 is a first front view of the example illuminable bracelet of FIG. 1.

Now referring to FIG. 6, a front view of illuminable bracelet 100 is shown. In this embodiment, buckle 102 is slightly tapered, which may provide comfort to a person wearing illuminable bracelet 100. Further, the size of the opening 114 formed by closed-loop 112 in relation to buckle 102 is merely an example. In some embodiments, the opening 114 may be considerably larger than buckle 102, and vice versa. In addition, those having ordinary skill in the art will understand that in band 104 may be elastically deformed such that band 104 tends to form closed-loop 112 rather than lay flat, even when closure member 150 is unsecured from buckle 102. In some embodiments, band 104 may be elastically deformed such that closed-loop 112 is more elliptical than circular. Still further, the thickness of band 104 shown in FIG. 6 is merely for example purposes. In other embodiments, the thickness of band 104 may be relatively larger or smaller than that shown.

Figure 7:
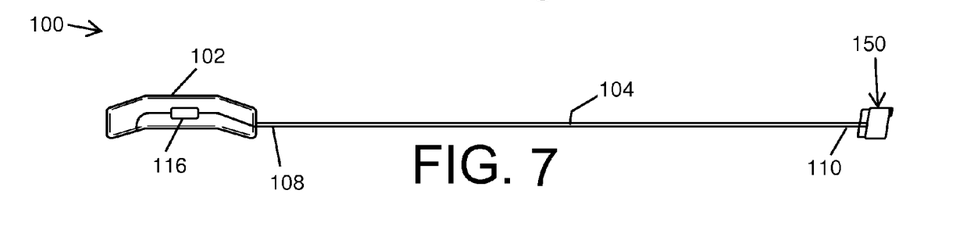
FIG. 7 is a first front view of the example illuminable bracelet of FIG. 1 shown in an open position.
Figure 8:
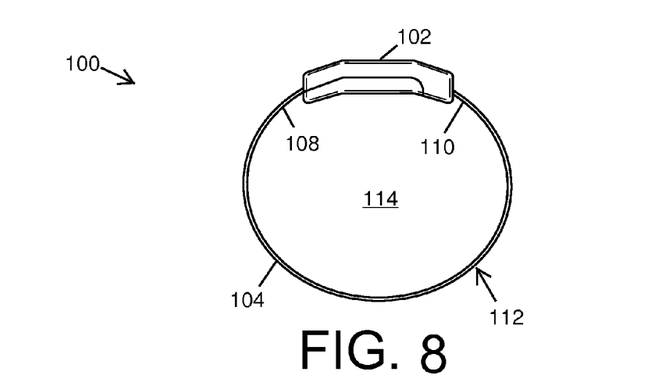
FIG. 8 is a second back view of the example illuminable bracelet of FIG. 1.
Figure 9:
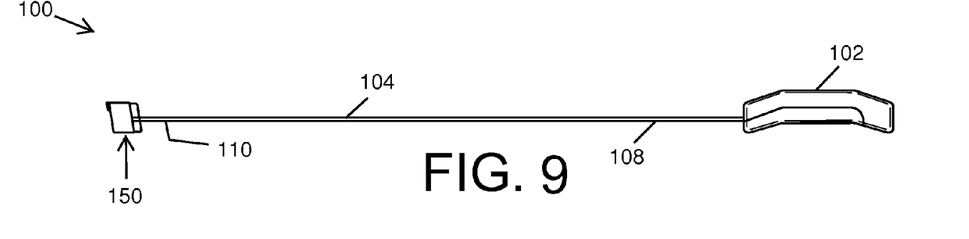
FIG. 9 is a second back view of the example illuminable bracelet of FIG. 1 shown in an open position.

FIG. 7 is similar to FIG. 6, except that illuminable bracelet 100 is shown to be laid flat. Further, FIGS. 8-9 are similar to FIGS. 6-7, respectively, except that FIGS. 8-9 show back views of illuminable bracelet 100.

Figure 10:
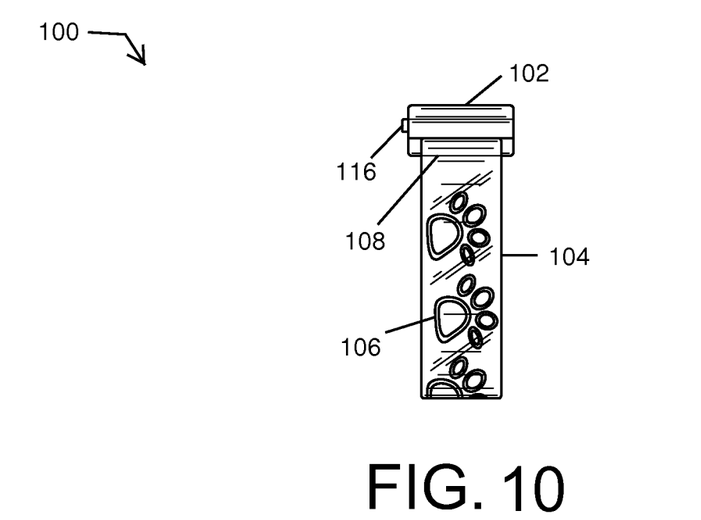
FIG. 10 is a first side view of the example illuminable bracelet of FIG. 1.
Figure 11:
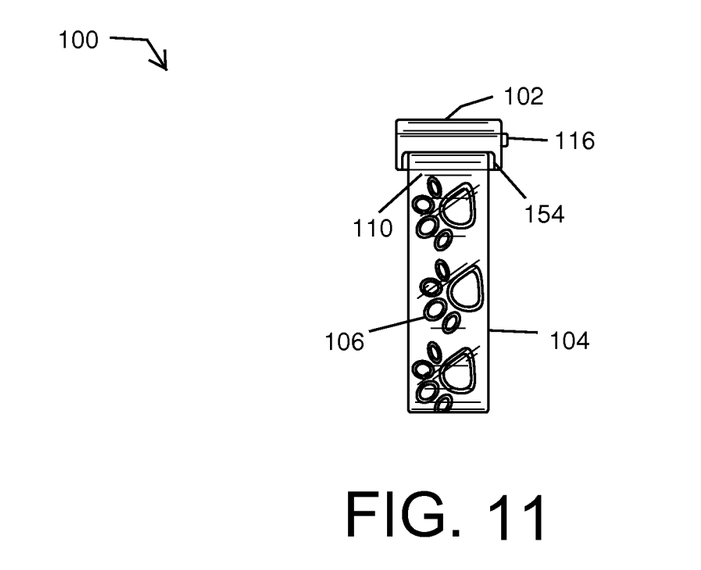
FIG. 11 is a second side view of the example illuminable bracelet of FIG. 1.

With reference now to FIGS. 10-11, two side views of illuminable bracelet 100 are shown. Switch 116 can be seen protruding from buckle 102 here, at least enough to allow a person to control switch 116 with one or more fingers. Moreover, in FIG. 10 in particular, first end 108 of band 104 can be seen attached to buckle 102. First end 108 may be attached to buckle 102 in a number of different ways. For example and without limitation, first end 108 of band 104 may be attached to buckle 102 by screws, by adhering the first end 108 within buckle 102, by using a bonding agent, or by securing an opening in first end 108 around a post in buckle 102 when assembling buckle 102. What's more, those having ordinary skill in the art will understand that the thickness of band 104 shown in FIGS. 10-11 is only for example purposes. In some examples, the thickness of band 104 may be much larger or smaller than that shown.

Figure 12:
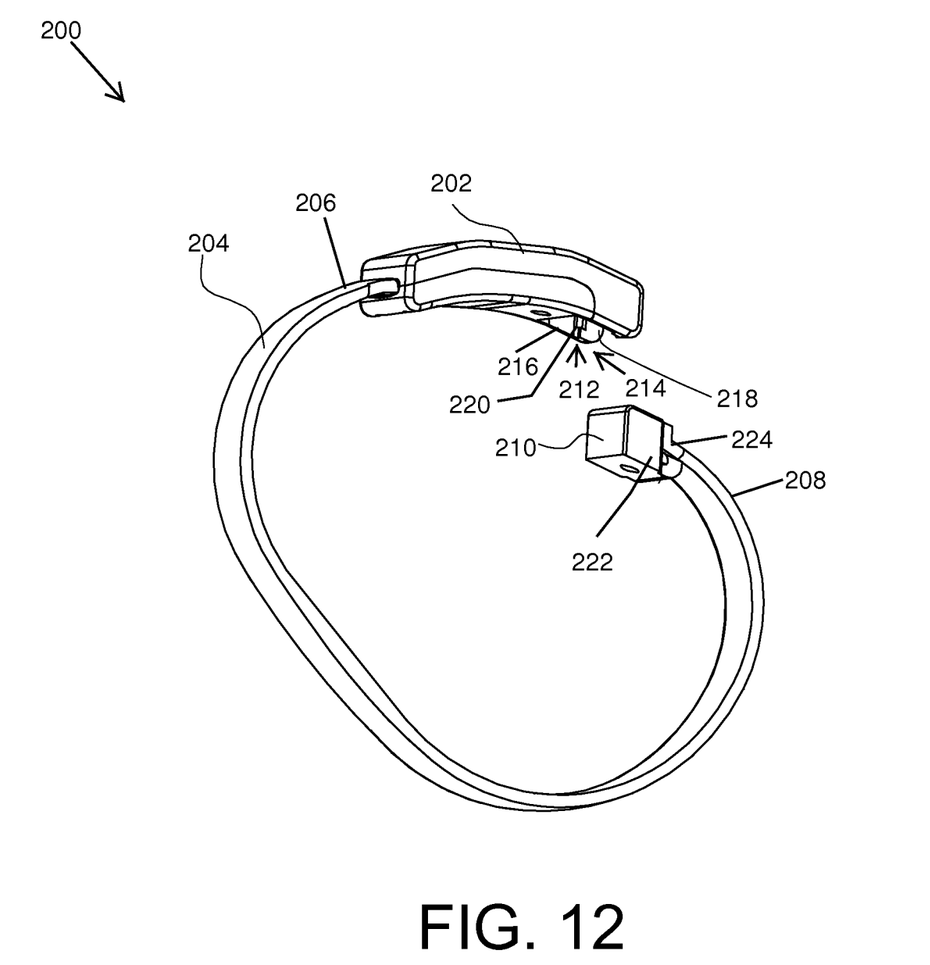
FIG. 12 is a perspective view of another example illuminable bracelet including an example latch.

With reference now to FIG. 12, a perspective view of another embodiment of illuminable bracelet 200 is shown. Similar to illuminable bracelet 100 of FIGS. 1-11, illuminable bracelet 200 of FIG. 12 generally includes a buckle 202, and a band 204 with a first end 206 and a second end 208. In this embodiment, first end 206 is affixed to buckle 202, and second end 208 has a closure member 210 disposed thereon. Logos have been omitted from band 204 for purposes of simplicity. It should be understood that band 204 is not as wide as band 104 of FIGS. 1-11. Likewise, buckle 202 is not as wide as buckle 102 of FIGS. 1-11.

Nonetheless, buckle 202 may have walls 212 defining an example cavity 214 in buckle 202. In one example, at least one of the walls 212 may have a first surface 216 and a second surface 218, with first surface 216 being offset from second surface 218. A lip 220 may be formed by the offset between first and second surfaces 216, 218. Lip 220 may retain the closure member 210 for band 204 when closure member 210 is inserted into cavity 214 of buckle 102. In this embodiment, closure member 210 may have a first portion 222 that is larger than second portion 224. When closure member 210 is secured to buckle 202, first portion 222 of closure member 210 may be positioned adjacent to first surface 216 of one of the walls 212 while the second portion 222 of the closure member 210 may be positioned adjacent to the second surface 218 of one of the walls 212. Further, to promote ingress and egress of closure member 210 into and from cavity 214, lip 220 may be angled with respect to band 204 such that closure member 210 may be slid downwards and away from cavity 214. In other examples, though, lip 220 may be angled with respect to the band 204 in a way that makes the closure member 210 less likely to inadvertently become unsecured from buckle 202. Other features that may prevent the closure member 210 from backing out of the cavity 214 include, for example, friction between the walls 212 and the closure member 210, or magnetics.

To reiterate, it should be understood that the closure member 210 disclosed above is merely one possible embodiment. In other embodiments, a closure member may comprise at least one hole in the second end 208 of the band 204 to cooperate with a spring-loaded bolt in the buckle 202. The spring-loaded bolt may engage with the at least one hole in the second end 208 of the band 204 upon closure of the bracelet. A user may press a button on the buckle 202 to disengage the spring-loaded bolt from the at least one hole.

Figure 13:
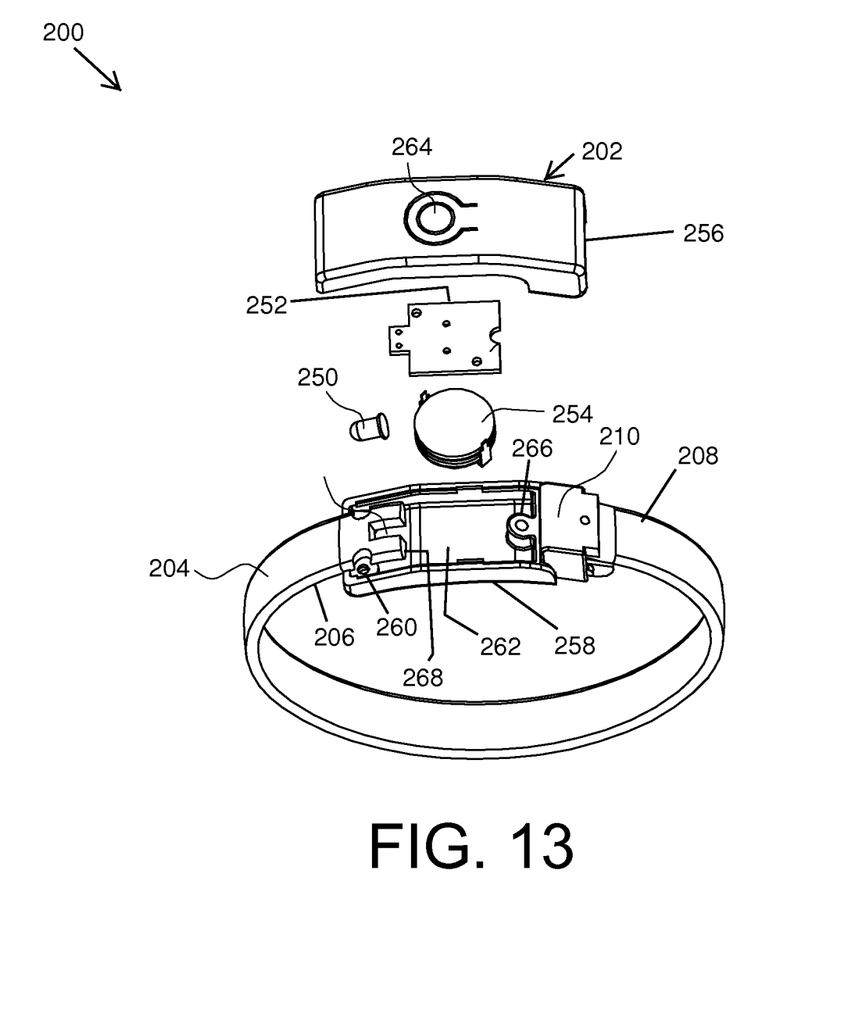
FIG. 13 is an exploded view of the example illuminable bracelet of FIG. 12 including an example buckle.

FIG. 13 shows a partial exploded view of the illuminable bracelet 200 of FIG. 12. In this embodiment, one possible way of assembling a light source 250 within the buckle 202 is to include a circuit board 252 and a power source 254 within the buckle 202. Here, buckle 202 includes a top portion 256 and a bottom portion 258. The top and bottom portions 256, 258 may be secured together, after any internal components are nested within portions 256, 258, by screws (not shown) that extend through holes 260 in the bottom portion 258 and into threaded fixtures (not shown) molded in the top portion 256. The screws may also retain the first end 206 of the band 204 to the bottom portion 258 of the buckle 202. The bottom portion 258 of the buckle 202 may further include a chamber 262 in which the power source 254, the circuit board 252, and other components may be nested.

In FIG. 13, buckle 202 includes a switch such as a push button 264 that operates similar to switch 116 of the illuminable bracelet 100 of FIGS. 1-11, except that a user pushes the push button 264 to cycle through the different modes of the illuminable bracelet 200. The power source 254 may be at three-volt lithium battery cell that is electrically coupled to the circuit board 252. In this situation, contacts extending from the circuit board 252 are electrically coupled to the light source 250. Yet further, a pressure-sensitive mechanism (not shown) may be coupled to the circuit board 252. Exerting a force on the push button 264 in turn exerts a force on the pressure-sensitive mechanism, which controls whether and how the circuit board 252 supplies power to the light source 250.

In addition, towards securing the circuit board 252 to the bottom portion 258 of buckle 202, circuit board 252 is located between tabs 266 of bottom portion 258. Towards securing the light source 250 within buckle 202, light source 250 is disposed between tabs 268 formed by first end 206 of band 204 positioned between the top and bottom portions 256, 258 of buckle 202. In another embodiment, the light source 250, which may comprise one or more LEDs as disclosed above, may be secured within the buckle 202 by areas molded into buckle 202. In some embodiments, the light source 250 may be co-planar with the first end 206 of the band 204, while in other embodiments the light source 250 may be above or below an imaginary plane in buckle 202 extending between first end 206 and second end 208 of band 204.

Although certain embodiments of the present invention have been described herein, it is not intended that the disclosure be limited merely to those embodiments. The foregoing description and drawings are merely to explain and illustrate the invention and the invention is not limited thereto except insofar as the appended claims are so limited, as those skilled in the art who have the disclosure before them will be able to make modifications and variations therein without departing from the scope of the invention.

I claim:

1. An illuminable bracelet comprising:
   a buckle defining a first cavity and a second cavity, the first cavity separated from the second cavity by a wall;
   a band having a first end and a second end, the first end being affixed to the buckle;
   a closure member coupled to the second end of the band, the closure member being releasably securable to the buckle within the first cavity of the buckle;
   at least one logo engraved, etched, or incised on an inner surface of the band; and
   a light source disposed in the second cavity of the buckle, the light source for illuminating the band, wherein light from the light source illuminates the at least one logo when power is supplied to the light source, wherein the at least one logo on the inner surface of the band is visible on an outer surface of the band when the band is illuminated and worn by a person or a pet.

2. The illuminable bracelet of claim 1, wherein the light from the light source is visible at the second end of the band to a human eye.

3. The illuminable bracelet of claim 1, further comprising a switch disposed on the buckle, wherein the switch is used for selecting the color the light source displays from a plurality of available colors.

4. The illuminable bracelet of claim 1, further comprising a switch disposed on the buckle, wherein the switch is capable of changing the light source between at least a first mode where the light source is in an ON state and a second mode where the light source is in an OFF state.

5. The illuminable bracelet of claim 4, wherein the light source has a third mode capable of being activated by said switch where the light source strobes between the ON and OFF states.

6. The illuminable bracelet of claim 4, wherein the switch is slidable between at least a first position corresponding to an OFF state and a second position corresponding to an ON state.

7. The illuminable bracelet of claim 1, wherein the buckle comprises a lip adjacent to the first cavity, the lip configured to interact with the closure member to secure the closure member within the first cavity.

8. An illuminable bracelet comprising:
   a buckle having a top portion and a bottom portion, the top portion and bottom portion collectively defining a first cavity and a second cavity, the first cavity separated from the second cavity by a wall;
   a band having a first end and a second end, the first end being affixed to the buckle, wherein at least one logo is engraved into an inner surface of the band;
   a closure member coupled to the second end of the band, the closure member for releasably securing the second end of the band within the first cavity of the buckle to form a closed loop; and
   a power source disposed between the top and bottom portions of the buckle within the second cavity, the power source for providing power to a light source disposed between the top and bottom portions of the buckle, the light source for illuminating the band;
   wherein light from the light source illuminates the at least one logo when power is supplied to the light source, wherein the at least one logo on the inner surface of the band is visible on an outer surface of the band when the band is illuminated and worn by a person or a pet.

9. The illuminable bracelet of claim 8, further comprising a switch disposed on the buckle, the switch for changing the light source between at least a first mode where the light source is in an ON state and a second mode where the light source is in an OFF state.

10. The illuminable bracelet of claim 8, wherein the switch is slidable between at least a first position corresponding to an ON state and a second position corresponding to an OFF state.

11. The illuminable bracelet of claim 8, wherein the band is transparent such that the light from the light source is visible at the second end of the band to a human eye.

12. The illuminable bracelet of claim 8, wherein the top portion of the buckle and the bottom portion of the buckle are separately formed.

13. The illuminable bracelet of claim 8, wherein the buckle comprises a lip adjacent to the first cavity, the lip configured to interact with the closure member to secure the closure member within the first cavity.

14. An illuminable bracelet comprising:
   a buckle defining a first cavity and a second cavity separated by a wall;
   a band having a first end and a second end, the first end being affixed to the buckle, wherein a plurality of logos are engraved on an inner surface of the band;
   a closure member coupled to the second end of the band for releasably securing the second end of the band within the first cavity of the buckle to form a closed loop;
   a light source disposed in the second cavity of the buckle for illuminating the band and the plurality of logos, wherein the plurality of logos engraved on the inner surface of the band are visible on an outer surface of the band when the band is illuminated and worn by a person or a pet; and
   a power source disposed in the buckle for providing power to the light source.

15. The illuminable bracelet of claim 14, wherein the band is formed of thermoplastic polyurethane (TPU), the band being transparent in that the light from the light source is visible at the second end of the band to a human eye.

16. The illuminable bracelet of claim 14, wherein the power source is disposed within the second cavity of the buckle.

17. The illuminable bracelet of claim 14, wherein the buckle comprises a lip adjacent to the first cavity and the closure member comprises a lip, the lip configured to interact with the closure member to secure the closure member within the first cavity.

* * * * *